US008606852B2

(12) United States Patent
Saillet (10) Patent No.: US 8,606,852 B2
(45) Date of Patent: *Dec. 10, 2013

(54) SERVER SIDE PROCESSING OF USER INTERACTIONS WITH A WEB BROWSER

(75) Inventor: Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,095

(22) Filed: Dec. 19, 2011

(65) Prior Publication Data

US 2012/0089672 A1 Apr. 12, 2012

Related U.S. Application Data

(63) Continuation of application No. 11/377,503, filed on Mar. 16, 2006, now Pat. No. 8,112,473.

(30) Foreign Application Priority Data

Mar. 17, 2005 (EP) .................................. 05102110

(51) Int. Cl.
*G06F 15/16* (2006.01)
*G06F 17/27* (2006.01)
*G06F 17/22* (2006.01)

(52) U.S. Cl.
USPC ........... 709/203; 709/202; 715/205; 715/234; 715/240; 715/243; 715/246

(58) Field of Classification Search
USPC .......... 709/201–203; 715/205, 234, 240, 243, 715/246
See application file for complete search history.

(56) References Cited

U.S. PATENT DOCUMENTS

| | | | | |
|---|---|---|---|---|
| 5,894,554 A | * | 4/1999 | Lowery et al. | ................ 709/203 |
| 6,052,730 A | * | 4/2000 | Felciano et al. | ............. 709/225 |
| 6,239,797 B1 | * | 5/2001 | Hills et al. | .................... 715/784 |
| 6,266,684 B1 | | 7/2001 | Kraus et al. | |
| 6,594,691 B1 | | 7/2003 | McCollum et al. | |
| 6,701,368 B1 | | 3/2004 | Chennapragada et al. | |
| 6,760,750 B1 | | 7/2004 | Boneh et al. | |

(Continued)

FOREIGN PATENT DOCUMENTS

TW 200511082 A 3/2005
WO WO 0137170 A2 5/2001

OTHER PUBLICATIONS

U.S. Appl. No. 11/377,503, Non-Final Office Action dated Apr. 16, 2009, (17 pgs).

(Continued)

*Primary Examiner* — Luat Phung
*Assistant Examiner* — Kai Chang
(74) *Attorney, Agent, or Firm* — Toler Law Group, PC (57) ABSTRACT

A method includes receiving input at a computer. The input is associated with an application frame of a client-side web browser. The method includes encoding control characteristics of the input as at least a portion of a request to a server-side web application. The method includes sending the request to the server-side web application and receiving an executable response from the server-side web application at a mediator frame of the client-side web browser. The method also includes executing the executable response via the mediator frame to update at least a portion of the application frame of the client-side browser.

19 Claims, 5 Drawing Sheets

(56) References Cited

U.S. PATENT DOCUMENTS

| | | | |
|---|---|---|---|
| 6,785,891 B1* | 8/2004 | Allen et al. | 719/313 |
| 6,901,554 B1 | 5/2005 | Bahrs et al. | |
| 6,983,421 B1 | 1/2006 | Lahti et al. | |
| 6,990,534 B2* | 1/2006 | Mikhailov et al. | 709/250 |
| 7,216,300 B2 | 5/2007 | Dang | |
| 7,246,314 B2 | 7/2007 | Foote et al. | |
| 7,246,324 B2 | 7/2007 | Mikhail et al. | |
| 7,287,227 B2 | 10/2007 | Ries et al. | |
| 7,293,034 B2 | 11/2007 | Paya et al. | |
| 7,299,409 B2* | 11/2007 | Joshi et al. | 715/234 |
| 7,464,381 B1* | 12/2008 | Nickerson et al. | 719/311 |
| 7,480,698 B2* | 1/2009 | Potter | 709/217 |
| 7,509,397 B1* | 3/2009 | Totty et al. | 709/219 |
| 7,523,401 B1 | 4/2009 | Aldridge | |
| 7,533,144 B2* | 5/2009 | Kassab | 709/203 |
| 7,571,219 B2* | 8/2009 | Cejka et al. | 709/219 |
| 8,112,473 B2 | 2/2012 | Saillet | |
| 8,135,620 B2* | 3/2012 | Barsade et al. | 705/14.73 |
| 2002/0007393 A1 | 1/2002 | Hamel | |
| 2003/0164859 A1* | 9/2003 | Evans | 345/792 |
| 2004/0177147 A1 | 9/2004 | Joshi et al. | |
| 2005/0097557 A1 | 5/2005 | Bradfield et al. | |
| 2005/0108390 A1* | 5/2005 | Nickerson et al. | 709/224 |
| 2006/0053224 A1* | 3/2006 | Subramaniam | 709/227 |
| 2006/0168540 A1 | 7/2006 | Cejka et al. | |
| 2006/0184684 A1* | 8/2006 | Weiss et al. | 709/231 |
| 2007/0226613 A1 | 9/2007 | Tandriono et al. | |

OTHER PUBLICATIONS

U.S. Appl. No. 11/377,503, Final Office Action dated Oct. 14, 2009, (20 pgs).

U.S. Appl. No. 11/377,503, Non-Final Office Action dated Feb. 18, 2010, (23 pgs).

U.S. Appl. No. 11/377,503, Final Office Action dated Aug. 4, 2010, (25 pgs).

Jesse James Garret, Ajax: A New Approach to Web Applications; http://www.adaptivepath.com/ideas/ajax-new-; Feb. 18, 2005.

Chris Justus—Server Side Guy, Google Suggest Dissected . . . ; http://www.serversideguy.blogspot.com/2; Dec. 14, 2004.

* cited by examiner

SERVER SIDE PROCESSING OF USER INTERACTIONS WITH A WEB BROWSER

CLAIM OF PRIORITY

This application is a continuation application of, and claims the benefit of, and priority from U.S. patent application Ser. No. 11/377,503, filed Mar. 16, 2006, which claims the benefit of and priority from European Patent Application No. 05102110.3, filed Mar. 17, 2005, the contents of which are expressly incorporated herein by reference in their entirety.

FIELD OF THE DISCLOSURE

The present disclosure relates to computer applications and in particular to a method and system for client-side interacting with a server-side web application—and vice versa—in a web-based client-server environment, in which a client-side web browser is used as an application user interface.

BACKGROUND

Traditionally in web-based client-server environments, a web browser is used for displaying web pages sent by a server-side web application within a browser application frame. The web browser is also used for converting events triggered by one or more user actions within the browser application frame into a request directed to the server-side web application. As the browser functionality is small compared to stand-alone applications, this web-user interface may be considered as a "light" version compared to the user interface operated by a stand-alone application without an interconnected web connection.

Figure 1:
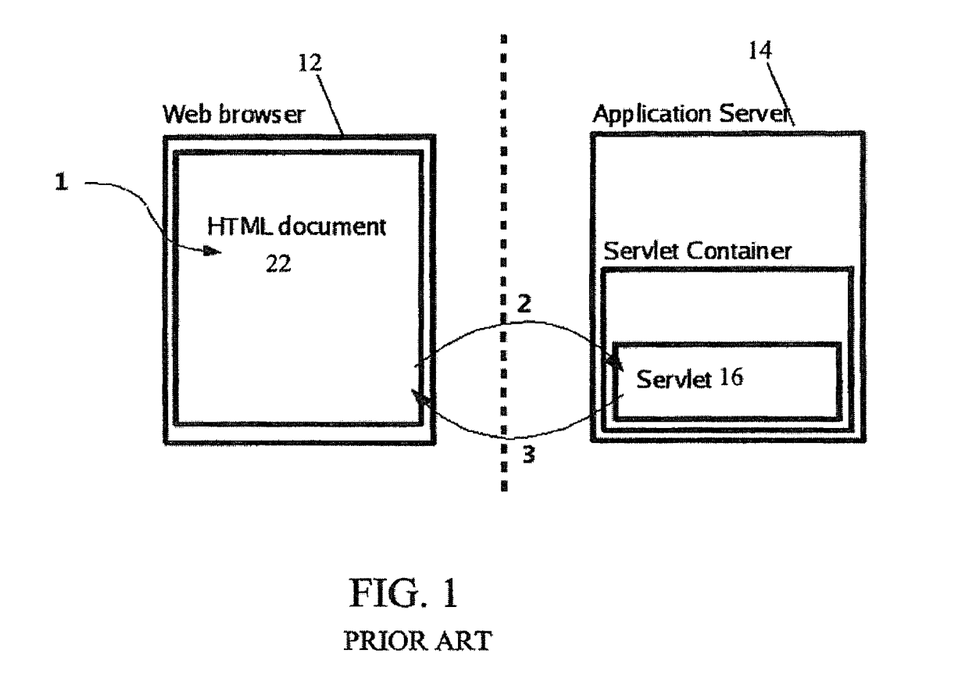
FIG. 1 is a schematic prior art system diagram showing basic structural and functional elements thereof.

With reference to FIG. 1, a prior art web-application, involving a web browser 12 as a "light" client having a low-level functionality user interface and an application server 14 hosting the application, suffers from a lack of interactivity with the user and from difficult programming models.

Typically a prior art web application works as follows:

On receipt of a user interaction 1 (e.g., a click on a link, pressing a button, pressing of one or more keys, or activation of any interactive component on a page of the web browser 12), the web browser makes a request to the application server 14 by sending a hypertext transfer protocol (HTTP) request 2 pointing to a uniform resource locator (URL). Possibly, a set of parameters to be interpreted by the application server 14 may be passed with the HTTP request 2. These parameters may contain information about the interaction the user did on the page and can be passed to the application server 14 either as URL-encoded parameters in an HTTP GET request or as data in the body of an HTTP POST request.

The request 2 is processed by a servlet 16 or a Java Server Page (JSP), which generates a hypertext mark-up language (HTML) document and sends the HTML document back to the web-browser 12 as a response 3.

The HTML document generated by the servlet 16 typically contains links or interactive elements with links to URLs (i.e., either to different servlets/JSPs, or to the same servlet 16 with different parameters).

When the user clicks on one of these interactive elements, the browser is redirected to the new URL. A new HTTP request is sent to the application server 14, which generates a complete new HTML document and sends it back to the web browser 12. The new document replaces the old one. Subsequent processing of user inputs includes receiving user actions 1, sending HTTP requests 2, and receiving responses 3.

However, there are several drawbacks to this general prior art approach:

First, since each user-interaction reloads an entire document, there is a long time delay between the user interaction and the visual response from the application, since the entire document has to be transmitted through a network before the document is displayed again by the web browser 12. Thus, it is not possible to build highly-interactive user interfaces where a large number of user events (e.g., mouse events or other user input) can be processed by the application server 14.

Second, a programming model to realize such applications is complex. Since each user interaction leads to the replacement of the current document with a new document, the logic of the web application program at the application server 14 becomes complicated, as current status information about the current session has to be passed to the application server 14 in order to be used in the new document.

Third, the programming model of the web application is completely different from the programming model of a standalone application. In a standalone offline application, user interface logic can be implemented within a single panel by listening to the events coming from the elements of the panel and responding with property changes in other elements of the same panel. For instance, when button A is clicked, the color of text B is changed. In a web application, every user-triggered event is associated with the generation of a new document. This makes porting standalone application user interface logic to a web application impossible without a complete reengineering of the user interface.

The reason for this drawback is found to be technical limitations of the client side. Web browsers were originally designed to display static content (text and images). Thus, web browsers offer very limited programming capabilities. Although numerous plug-ins have been developed to enhance the capabilities of the web browsers, the web browsers are basically still simple client software that can only send requests to a web server and display the returned documents.

To compensate for the lack of capabilities of the web browsers, several specific prior art solutions have been developed by the industry. Such solutions may comprise an executable program object which is used at the client side as a part of the client-side web application user interface. Examples of this executable code are scripts written in a scripting language (e.g., JavaScript, Dynamic HTML (DHTML), ECMA Script, or other scripting language) and applets (e.g., Java applets).

A scripting language can be used to modify the content of a displayed document. A script has to be defined in the document loaded by the web browser 12. The execution of the script is made by the web browser 12 itself. Thus, the application server 14 prepares the script, sends it to the web browser 12, but as soon as the document is displayed in the web browser 12, the application server 14 has no further influence on it.

The use of applets enables complete programs to be downloaded on the client. The applets are executed in the web browser 12.

These approaches have, however, considerable drawbacks. Scripting languages allow modification of "on-the-fly" elements of a displayed document without having to reload the whole document, but the scripts implementing this user interface behavior have to be fully defined in the original document downloaded from the application server 14. Once the document is loaded, the application server 14 does not interact anymore with the user interface and the script cannot be modified until a new document is loaded.

Applets are very flexible and can open additional communication channels with application servers (e.g., application server 14), but disadvantageously the whole code of the application to execute has to be downloaded to the client and executed by the web browser 12. This also involves some considerable problems. The problems may include length of time to download the document, security issues due to the applet, and compatibility issues with a virtual machine used by the web browser 12 to execute the applet.

Again with reference to FIG. 1, if the user interaction 1 can be processed locally by the web browser 12 (i.e., the reaction to this user interaction is defined in the JavaScript sent with the HTML document sent as the response 3), the scripts statically embedded in the page can process it and the process stops here. But this is not a satisfying solution due to the reasons described above.

Because of these drawbacks, web applications are still limited to components with a low interactivity (i.e., they generally include text fields, buttons, links in their user interface). Applications using complex mouse interactions (e.g., drag and drop of elements) are difficult to realize. It is thus an objective of the present disclosure to alleviate the disadvantages of the prior art.

SUMMARY

The disclosure includes the use of an application frame and an additional frame in a web browser to communicate with an application server. The additional frame prevents the displayed document from being reloaded when the application server sends its response.

Accordingly, methods and systems for client-side interacting with a server-side web application in a web-based client-server environment are disclosed. A client-side web browser is used as a user interface for displaying web pages that are sent by the server-side web application within a browser application frame. The client-side web browser is used for converting events triggered by one or more user input actions within the browser application frame into a request directed to the server-side web application. A client-server request-response communication dialogue is performed stepwise with the server-side web application responsive to the user input actions. The client-server request-response communication dialogue between the client and the server-side web application may include a) receiving an executable display programming means in a hidden frame (herein called a "mediator frame") together with response parameters generated by the server-side web application and b) executing the display programming means from within the mediator frame, wherein the execution displays the response parameters at the application frame for updating the application frame only in part at predetermined locations.

An executable program object (e.g., a second executable programming means used for display purposes or the first executable programming means used for input-sensing purposes) may be, for example, a Java Script or a Java Applet, or a VB-Script (Visual Basic script supported by MS-Internet Explorer), or any other suitable program object.

Advantageously, the client-side, hidden, mediator frame is a frame with the following properties: a) it is fully invisible to the user or at least quite small such that it does not attract the user's attention, b) it does not display any visual information to the user, c) it sends to the server-side web application HTTP requests prepared by the application frame and receives the answer of the server-side web application to this request instead of the application frame itself receiving the answer as is usual in the prior art, and d) it executes the result of the server-side web application and modifies only the content of the application frame, without changing the rest of the frame image. The mediator frame may be fully hidden.

The mediator frame realizes communication between the application frame and the server-side web application. The mediator frame may send the requests of the application frame to the server-side web application, and receive and interpret the answer of the server-side web application. Thus, the mediator frame acts as a mediator in all communications between application frame and server-side web application. The mediator frame may advantageously be hidden from the user in order to be seamlessly integrated into commonly used user interfaces.

The present disclosure describes capturing user events (i.e., key and mouse events) on a web browser, transmitting these events to the server-side web application, letting the server-side web application interpret these events and compute a response which is sent back to the web browser. The response can modify a part of the document displayed on the web browser without requiring the reloading of the whole document. This allows a fine grained response from the server to user interaction events without having to reload the document between each user interaction event. Data exchanged between the client and the server-side web application is compact since only the modifications to make to the document are sent to the client, instead of the whole document. This may enable "content-focused" communication that leads to better performance and allows more client/server interactions.

The logic of the web application stays on the server-side web application, which saves traffic on the network and increases security of the client application. Only visual information is sent to the web browser. This is a further step against piracy.

The web application is run on the server-side web application. The web browser is only used to display the user interface. Thus, resources of the server-side web application can be leveraged.

The disclosure may be used with browsers without having to install a specific plug-in. There is no incompatibility issue as may be present with Java applets and the different Java versions.

BRIEF DESCRIPTION OF THE DRAWINGS

The present disclosure is illustrated by way of example and is not limited by the shape of the figures of the drawings in which.

DETAILED DESCRIPTION

Figure 2:
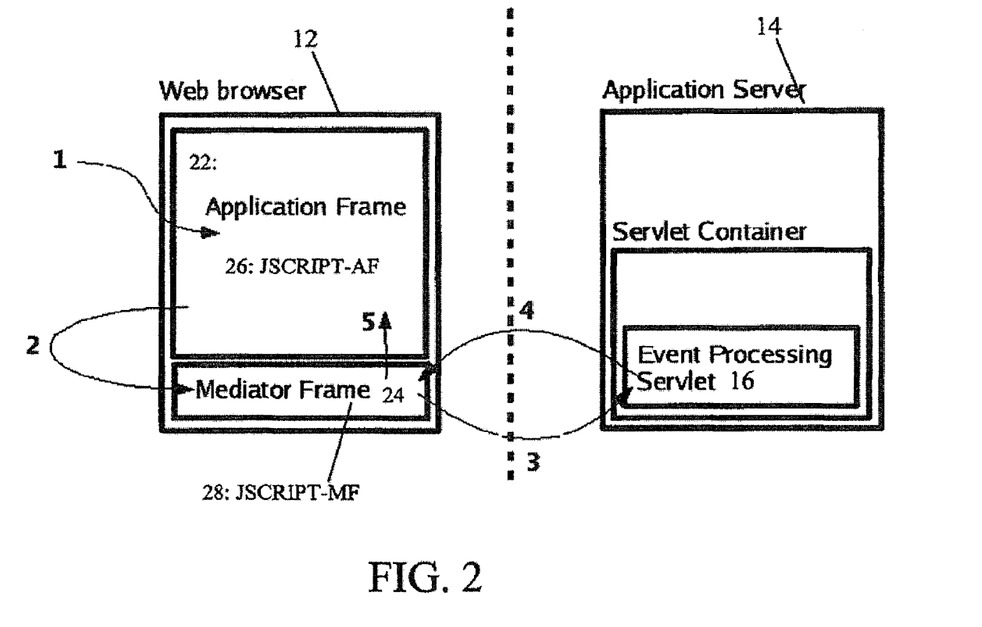
FIG. 2 is a schematic system diagram showing basic structural and functional elements.

With general reference to the figures and with special reference to FIG. 2, two different frames are used at a web browser 12. First, an application frame 22 is used to display a web application and interact with a user. The document displayed in the application frame 22 should be a document which allows capture of user interaction and may be dynamically modified with JavaScripts. In an embodiment, a document implementing the Document Object Model Level 2 (DOM2) specifications is used. Alternatively, a DHTML document, a Scalable Vector Graphic (SVG), a XUL (User Interface Language used in Mozilla Browser), or any XML based document may be used. The DOM2 specification is selected because it represents a platform and language neutral interface recommended by the W3C Consortium. The platform and language neutral interface allows programs and scripts to dynamically access and update the content and structure of documents.

Second, a mediator frame 24 is used to communicate with a servlet 16 of an application server 14. The mediator frame 24 should remain hidden, for instance by setting its width/height to zero. The user is advantageously not supposed to interact with the mediator frame 24, or even notice that the mediator frame 24 exists, in order to keep the user interface simple. The user only interacts with the application frame 22. Thus, in contrast to the mediator frame 24, the application frame 22 can be considered as a "displaying" frame, as any content is displayed to the user within the application frame 22.

The document displayed in the application frame 22 uses a first executable input-sensing programming means 26 (e.g., JSCRIPT-AF, which may be a minimal JavaScript for the application frame 22) that detects and senses a user interaction 1 and encodes the user interaction 1 into a URL 2 that is sent to the mediator frame 24. The mediator frame 24 sends a request 3 with the URL 2 to the servlet 16 controlling the application. The mediator frame 24 gets an answer 4 from the application server 14 including an executable program means 28 (e.g., JSCRIPT-MF, which may be a JavaScript for the mediator frame 24). The mediator frame 24 executes the executable program means 28 and a result 5 is passed to the application frame 22. By the execution of the executable program means 28, new content calculated at the application server 14 is displayed at the application frame 22. Thus, the workflow of the application is progressed without loading a new HTML document. Only the new information relevant for the user to see is updated in the application frame 22.

In another embodiment, the application frame 22 uses the first executable input-sensing programming means 26 to detect and sense the user interaction 1. The application frame 22 encodes the user interaction into the URL 2 and sends a request with the URL to the servlet 16. The request indicates that the answer 4 should be sent to the mediator frame 24. This embodiment may be used when a chosen implementation uses HTTP-POST requests to communicate with the application server 14.

In a first embodiment that uses an HTTP-GET request (data limited to 4 Kb), the application frame 22 may encode parameters into a URL in response to user interaction 1. Then, the application frame 22 may "ask" the mediator frame 24 to load the document as this URL. In a second embodiment that uses an HTTP-POST request (no size limitation), the application frame 22 will typically prepare a request with a hidden formula and send the request itself to the servlet 16 with an indication that the response should go to the mediator frame 24. In both embodiments, the request is prepared by the application frame 22, because the mediator frame 24 should contain as little logic as possible since the mediator frame 24 is reloaded at each interaction. The difference between the embodiments is how the request is sent to the servlet 16.

Figure 3:
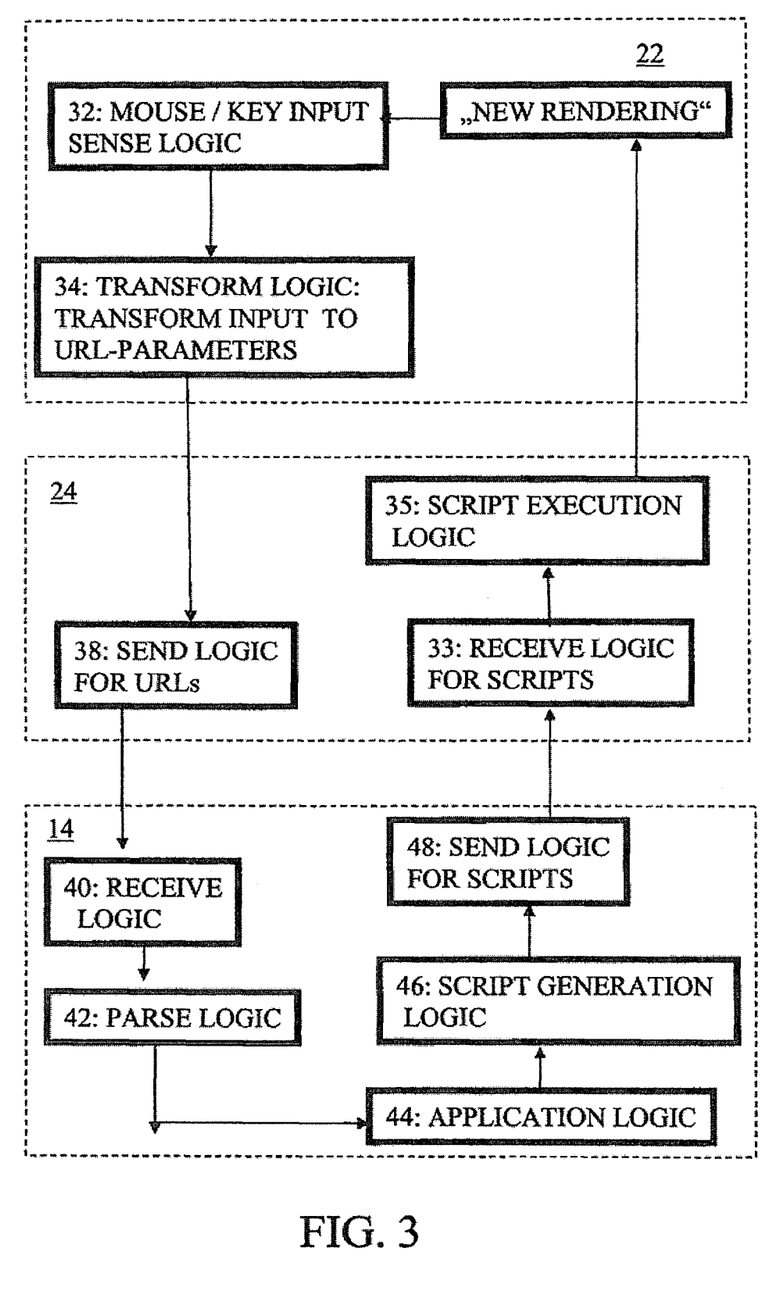
FIG. 3 is a schematic diagram illustrating the basic logical elements of an application frame (top), a mediator frame (centre), and server logic (bottom) and respective interfaces.

FIG. 3 depicts structural details of an application frame 22 and a mediator frame 24. A task of the mediator frame 24 is to send a request to the application server 14 and avoid the document on which the user works from being replaced or reloaded. The application frame 22 provides logic for preparing the document.

The application frame 22 comprises a sense block 32, which senses and collects any events (i.e., input done by the user for user control of the application frame 22 via key or mouse input) as event characteristics. Event characteristics comprise the event type, mouse coordinates, key pressed, etc.

Further, a transform logic 34 is provided in the application frame 22 to transform the event characteristics to text-based key-value pairs. The text-based key-value pairs can be stored as an HTTP request. For example, the HTTP request may include:

eventType=mouseDown; screenX=100; screenY=150; mouseButton=1

The transformation is independent of the content of the page. An example of prior art web application logic may be expressed as:
if Button1 is clicked, go to URL XY
An example of transform logic 34 may be expressed as:
if ANY button is CLICKED, put the key-pair value eventType=ButtonClick, eventTarget=%ID_of the_button_where_the_event_occurred as parameters into a request to be sent to an application server, which is independent from the button which was clicked.

Thus, a list of text parameters is passed from the application frame 22 to the mediator frame 24. The list of text parameters reflects a user input event.

The mediator frame 24 receives a HTTP request including the text parameters from the transform logic 34. The mediator frame 24 sends the HTTP request via HTTP to a URL. The implementation of any logic needed for detecting the user input event and encoding the URL with the event parameters, is not realized in the mediator frame 24, but in the application frame 22. This way the script which does the detection and encoding does not need to be reloaded each time an event happens. The contents and scripts in the mediator frame 24 are fully replaced after each HTTP request. This is depicted in FIG. 3 by blocks 32 and 34 being in the application frame 22 and blocks 33, 35, and 38 being in the mediator frame 24.

At the web application server 14 of FIG. 3, the request is received in block 40. A server-side parameter evaluation logic parses and extracts the parameter values in parse block 42. Application logic block 44 derives the user input from the output of parse block 42. The application logic block 44 processes this user input and calculates a response.

A script generation block 46 is provided. The script generation block 46 generates a script that contains executable code. When the script is executed in block 35 of the mediator frame 24, the script implements the web application response within the application frame 22 without loading the whole frame again from the web application server 14. This newly displayed section of the application frame 22 serves as an updated frame in order to be attended by the user. The user may now implement another event that is again sensed by sense logic 32. Thus, the loop may be reentered and all logic blocks depicted in FIG. 3 may be used again in a similar way.

Figure 4:
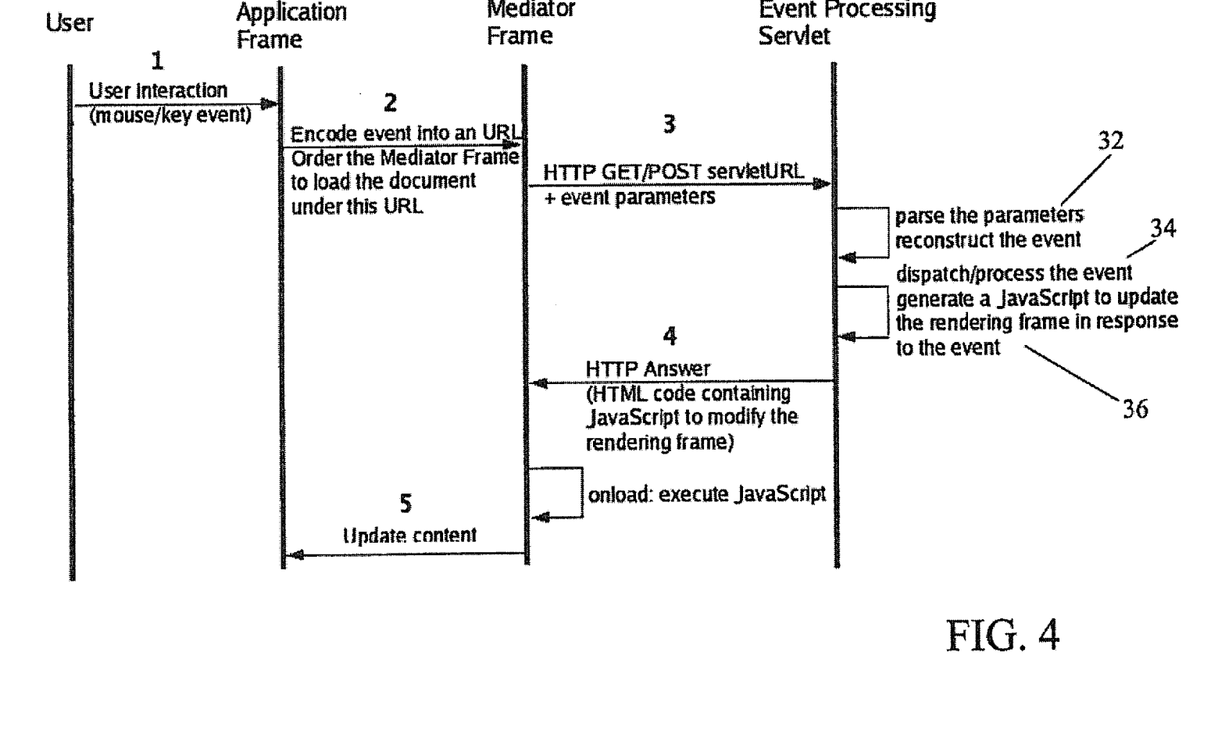
FIG. 4 is a schematic control flow diagram.
Figure 5:
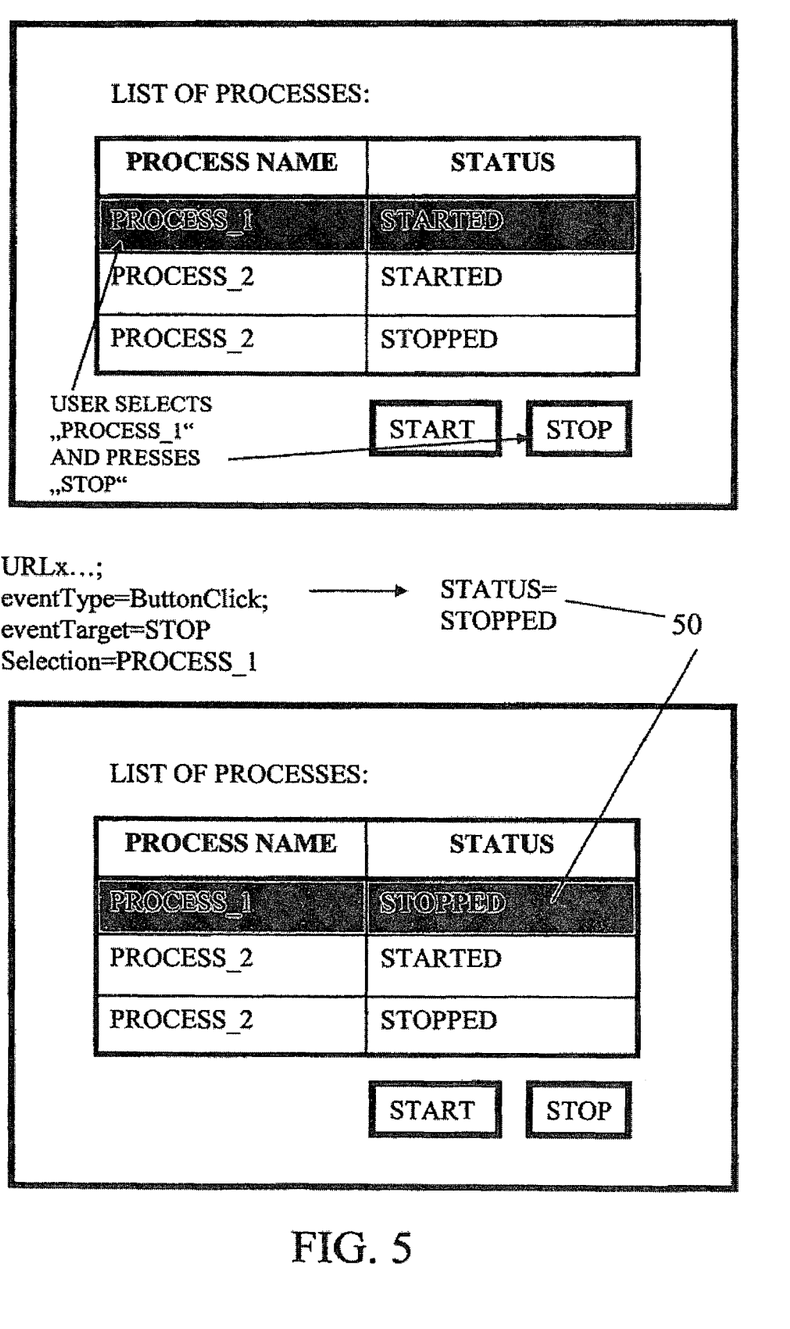
FIG. 5 is an exemplary schematic application frame representation illustrating content-focused communication between server and client.

With additional reference to FIGS. 2, 4 and 5, control flow is described as follows:

Step 1: The user interacts with the application frame 22 by producing a mouse or a key event. Assume with reference to a top portion of FIG. 5 that a web application displays a list of processes and their respective status (started, stopped) in a table at the application frame 22. The web application allows the user to start or stop a process by selecting the process in the table and pressing one of the two buttons START and STOP located under the table. Assume a user selects the process "PROCESS_1" in the table and clicks on the button "STOP."

Step 2: a first executable input-sensing programming means 26 (i.e., the JavaScript-AF 26 depicted in FIG. 2 and represented by logic blocks 32 and 34 in the application frame 22 of FIG. 3) collects the mouse interactions in the above table and registers that the STOP button was clicked with the left mouse button. This ensemble of user actions is understood as an event. The JavaScript-AF 26 of the application frame 22 detects the event, extracts its characteristics (i.e. type, target, key pressed, etc.), encodes these characteristics as event-specific key-value pairs into a predetermined URL pointing to the servlet 16, and orders mediator frame 24 to load the document corresponding to this URL. Alternately, the application frame 22 can send a request with the additional information that the response from the servlet 16 has to be displayed in the mediator frame 24. This can be implemented for instance by using a hidden formula in the application frame 22 that will send a HTTP POST request to the application server 14. The HTML/JavaScript language makes it possible to specify that the document returned by the application server 14 has to be displayed in a different frame. The request results in the response replacing the document in the mediator frame 24, which is hidden. The response does not result in replacement of the application frame 22.

Step 3: a HTTP request is sent to the servlet 16 (i.e., from the application frame 22 or the mediator frame 24), wherein the request contains information about the user interaction detected at the application frame 22. That is, the characteristics, stored as key-value pairs (Event type is "ButtonClick", event target is button "STOP", table selection is "PROCESS_1"), are transferred as parameters in the request.

Step 4: the servlet 16 at the application server 14 reads the information incoming at the specified URL, decodes the information, and computes a response to return according to the desired web application program logic. In the particular example, the application processing may be assumed to include an enterprise database access and some data processing in order to yield some response data to this user request. Also this may be implemented differently, for instance by pre-storing a number of JavaScripts and respective workflow response data if the respective enterprise workflow is appropriate.

Alternatively and program-depending, the response data may be calculated during runtime. The application server response is again content-focused, as the parameters transported in the server response basically contain content rather than GUI graphics. In the example, the calculated response would be to change in the table the status text corresponding to "PROCESS_1" from "STARTED" to "STOPPED". This may be an HTML document containing the executable programming means 28 (e.g., JSCRIPT-MF) to be executed by the web browser 12 when the document is loaded by the web browser 12. The executable programming means 28 contains the content. As it may be appreciated by the skilled reader, this content is only delta information 50 depicted in FIG. 5, which is used to update the application frame 22 without loading it completely from the application server 14.

Step 5: once the response document is received by the mediator frame 24, the executable programming means 28 (i.e., the JavaScript-MF) is executed. The executable programming means 28 modifies the document in the application frame 22 by adding new elements, removing existing elements, or modifying properties of existing element. The rest of the document displayed in the application frame 22 needs not to be reloaded.

The present disclosure can be realized in hardware, software, or a combination of hardware and software. A web application according to the present disclosure can be realized in a centralized fashion in one computer system or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present disclosure can also be embedded in a computer program product, which comprises all the features enabling the implementation of the disclosure described herein, and which, when loaded in a computer system, is able to carry out the disclosure.

Computer program means or computer program in the present context mean any expression, in any language, code or notation, of a set of instructions intended to cause a system having an information processing capability to perform a particular function either directly or after either or both of the following: conversion to another language, code or notation; and reproduction in a different material form.

What is claimed is:

1. A method of updating an application frame of a client-side web browser comprising:

detecting input at a computer, wherein the input is associated with the application frame of the client-side web browser, and wherein the input is detected by a script of the application frame without reloading the script for each update to the application frame;

encoding control characteristics of the input as at least a portion of a request to a server-side web application, wherein the control characteristics of the input are encoded in the request by the script of the application frame resulting in the request being generated by the application frame, and wherein content of the application frame is visible on a display and wherein the request generated by the application frame is independent of the content of the application frame;

sending the request generated by the application frame to the server-side web application at a server;

receiving an executable response from the server-side web application at a mediator frame of the client-side web browser responsive to the request generated by the application frame, wherein the mediator frame is configured to be reloaded for each update to the application frame by replacing any content and any script of the mediator frame; and executing the executable response via the mediator frame to update at least a portion of the application frame of the client-side web browser.

2. The method of claim 1, wherein the request generated by the application frame is sent to the server-side web application via the application frame and wherein the request generated by the application frame includes information indicating that the executable response is to be sent to the mediator frame.

3. The method of claim 1, wherein the request generated by the application frame is sent to the server-side web application via the mediator frame.

4. The method of claim 1, wherein the mediator frame is hidden on the display.

5. The method of claim 1, wherein the mediator frame is visible on the display as a region without visible content.

6. The method of claim 1, wherein the input comprises mouse input.

7. The method of claim 1, wherein the input comprises at least one key entry.

8. A computer readable storage device storing instructions to update an application frame of a client-side web browser, that when executed by a processor, cause the processor to:
   detect input, wherein the input is associated with the application frame of the client-side web browser, and wherein the input is detected by a script of the application frame without reloading the script for each update to the application frame;
   encode control characteristics of the input as at least a portion of a request to a server-side web application, wherein the control characteristics of the input are encoded in the request by the script of the application frame resulting in the request being generated by the application frame, and wherein content of the application frame is visible on a display and wherein the request generated by the application frame is independent of the content of the application frame;
   send the request generated by the application frame to the server-side web application;
   receive an executable response from the server-side web application at a mediator frame of the client-side web browser responsive to the request generated by the application frame, wherein the mediator frame is configured to be reloaded for each update to the application frame by replacing any content and any script of the mediator frame; and
   execute the executable response via the mediator frame to update at least a portion of the application frame of the client-side web browser.

9. The computer readable storage device of claim 8, further comprising instructions executable by the processor to send the application frame and the mediator frame to the display.

10. The computer readable storage device of claim 9, wherein settings of a width and a height for the mediator frame are set to zero so that the mediator frame is hidden when sent to the display.

11. The computer readable storage device of claim 9, wherein the mediator frame includes no visible content when sent to the display.

12. The computer readable storage device of claim 8, wherein the application frame sends the request generated by the application frame to the server-side web application and wherein the request generated by the application frame includes information indicating that the executable response is to be sent to the mediator frame.

13. The computer readable storage device of claim 8, wherein the control characteristics of the input are encoded as text-based key-value pairs.

14. The computer readable storage device of claim 8, wherein the executable response comprises a script.

15. A system comprising:
   a processor,
   a memory including instructions to update an application frame of a web browser executable by the processor to:
      send content of the application frame of the web browser to a display;
      detect input associated with the content of the application frame sent to the display, wherein the input is detected by a script of the application frame without reloading the script for each update to the application frame;
      encode control characteristics of the input as at least a portion of a request to a server-side web application, wherein the control characteristics of the input are encoded in the request by the script of the application frame resulting in the request being generated by the application frame, and wherein content of the application frame is visible on a display and wherein the request generated by the application frame is independent of the content of the application frame;
      send the request generated by the application frame to the server-side web application;
      receive an executable response from the server-side web application at a mediator frame of the web browser responsive to the request generated by the application frame, wherein the mediator frame is configured to be reloaded for each update to the application frame by replacing any content and any script of the mediator frame; and
      execute the executable response via the mediator frame to update at least a portion of the application frame of the web browser.

16. The system of claim 15, wherein the input includes a button click, and wherein the control characteristics are descriptive of a screen position at which the button click occurred.

17. The system of claim 15, wherein the application frame sends the request generated by the application frame to the server-side web application and wherein the request generated by the application frame includes information indicating that the executable response is to be sent to the mediator frame.

18. The system of claim 15, wherein the mediator frame sends the request generated by the application frame to the server-side web application.

19. The system of claim 15, wherein the executable response comprises a script.

* * * * *